(12) United States Patent
Cheng et al.

(10) Patent No.: US 11,372,150 B2
(45) Date of Patent: Jun. 28, 2022

(54) BACKLIGHT MODULE AND DISPLAYING DEVICE

(71) Applicants: K-Tronics (Suzhou) Technology Co., Ltd., Jiangsu (CN); BOE Technology Group Co., Ltd., Beijing (CN)

(72) Inventors: Xianrong Cheng, Beijing (CN); Chuanwei Zhang, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/407,161

(22) Filed: Aug. 19, 2021

(65) Prior Publication Data

US 2022/0120953 A1 Apr. 21, 2022

(30) Foreign Application Priority Data

Oct. 21, 2020 (CN) .......................... 202011129482.2

(51) Int. Cl.
*F21V 8/00* (2006.01)

(52) U.S. Cl.
CPC .......... *G02B 6/0031* (2013.01); *G02B 6/0065* (2013.01); *G02B 6/0086* (2013.01)

(58) Field of Classification Search
CPC ................................................... G02B 6/0031
See application file for complete search history.

*Primary Examiner* — Robert J May
(74) *Attorney, Agent, or Firm* — IPro, PLLC

(57) ABSTRACT

A backlight module and a displaying device. The backlight module comprises a backplane, a reflector plate and a light guide plate that are disposed in sequence, a light strip disposed on a first side of the light guide plate, and a plurality of positioning assemblies disposed at two ends of the first side of the light guide plate respectively, wherein each light guide assembly comprises a positioning element disposed on the backplane and a guide surface disposed at a corner of the first side of the light guide plate. The positioning assemblies are disposed on the first side, where the light strip is located, of the light guide plate, such that the light guide plate will be driven to move away from support members under a reactive force of the positioning elements when expanding.

18 Claims, 3 Drawing Sheets

BACKLIGHT MODULE AND DISPLAYING DEVICE

The disclosure claims the priority of a Chinese patent application filed in the China National Intellectual Property Administration on Oct. 21, 2020 with application number 202011129482.2 and application name "Backlight Module and Displaying Device", the entire contents of which are hereby incorporated by reference.

TECHNICAL FIELD

The disclosure generally relates to the technical field of display (such as the technical field of computers), in particular to a backlight module and a displaying device.

BACKGROUND

In side backlight modules, the backlight optical component consists of a light strip, a reflector plate, a light guide plate and an optical film, wherein the light strip is a heat source, and the distance from the light guide plate to the surfaces of LEDs of the light strip is generally 0.3-0.5 mm; the temperature of the surfaces of the LEDs is extremely high, and when the LEDs drive a large current, light energy radiated by the surfaces of the LEDs will be increased and may fuse the light guide plate. Particularly, in an environment over 40°, the temperature of the light guide plate near the light strip will be greatly increased, so the light guide plate will be fused and deformed, which may seriously affect the backlight quality.

SUMMARY

The main purpose of the inventor is to provide a backlight module and a displaying device.

In one aspect, the disclosure provides a backlight module comprising a backplane, a reflector plate and a light guide plate that are disposed in sequence;

A light strip disposed on a first side of the light guide plate; and

A plurality of positioning assemblies disposed at two ends of the first side of the light guide plate respectively, wherein each positioning assembly comprises a positioning element disposed on the backplane and a guide surface disposed at a corner of the first side of the light guide plate.

Optionally, the guide surfaces are slopes extending towards two sides of a center line of a first plane of the light guide plate to be away from the light strip, and the center line is perpendicular to the light strip;

Planes where the slopes are located are perpendicular to the first plane of the light guide plate, and the first plane is a plane with the maximum area of all surfaces of the light guide plate.

Optionally, an angle θ between the slopes and a first edge of the light guide plate is determined according to the following formula:

$$Tan(180°-\theta)=h/(L3-L4)$$

Wherein, h is a target moving distance of the light guide plate in a second direction of the first plane, L3 is a single-sided expansion value of the light guide plate in a first direction of the first plane under a target expansion coefficient, L4 is a single-sided expansion value of the light guide plate in the first direction under a critical expansion coefficient, the first direction is parallel to the light strip and is perpendicular to the second direction, and an extension direction of the first edge is parallel to the first direction.

Optionally, the critical expansion coefficient is a humidity expansion coefficient, and the humidity expansion coefficient is an expansion coefficient of the light guide plate in a saturated moisture state;

The target expansion coefficient includes a temperature expansion coefficient and the humidity expansion coefficient, and the temperature expansion coefficient increases with the rise of temperature.

Optionally, a preset distance is set between contact points of the positioning elements and the guide surfaces when the light guide plate does not expand, and the contact points are contact points between the positioning elements and the guide surfaces after the light guide plate expands;

The preset distance is determined according to a distance X1 in the first direction and a distance Y1 in the second direction, the distance X1 is greater than or equal to the single-sided expansion value L4 under the critical expansion coefficient, and the distance X1 and the distance Y1 meet the following relation:

$$Y1=X1*\tan(180°-\theta)$$

Wherein, θ is the angle between the slopes and the first edge of the light guide plate;

The distance X1 is a distance from the contact points of the positioning elements to the guide surfaces in the first direction, and the distance Y1 is a distance from the contact points of the positioning elements to the guide surfaces in the second direction.

Optionally, the distance X1 is equal to the single-sided expansion value L4 under the critical expansion coefficient, and the distance Y1 is determined according to the following formula:

$$Y1=L4*\tan(180°-\theta)$$

Wherein, θ is the angle between the slopes and the first edge of the light guide plate.

Optionally, the positioning elements are cylindrical, and a central axis of rotation of the cylindrical positioning elements is parallel to the planes where the guide surfaces are located.

Optionally, tangent planes at the contact points of the positioning elements are parallel to the guide surfaces.

Optionally, the positioning elements are polygonal, and sides close to the guide surfaces of the polygonal positioning elements are parallel to the planes where the guide surfaces are located.

Optionally, support members disposed on the light strip, and a thickness of the support members is greater than a thickness of light sources on the light strips;

when the light guide plate does not expand, the support members contact with the light guide plate.

Optionally, the support members are made of a rigid material.

Optionally, the light guide plate is made of at least one of polystyrene and polymethyl methacrylate.

In a second aspect, the disclosure provides a displaying device, comprising a display panel and the backlight module provided by the embodiments of the disclosure, wherein the display panel is disposed on a light emitting side of the backlight module. The aforesaid description is merely a brief summary of the technical solution of the disclosure. To allow those skilled in the art to gain a better understanding of the technical means of the disclosure so as to implement the disclosure according to the contents in the specification and to make the above and other purposes, features and advantages of the disclosure clearer, specific implementations of the disclosure are given below.

BRIEF DESCRIPTION OF THE DRAWINGS

Other features, purposes and advantages of the disclosure will be clarified with reference to a detailed description of non-restrictive embodiments given in conjunction with the following drawings.

DETAILED DESCRIPTION

Figure 1:
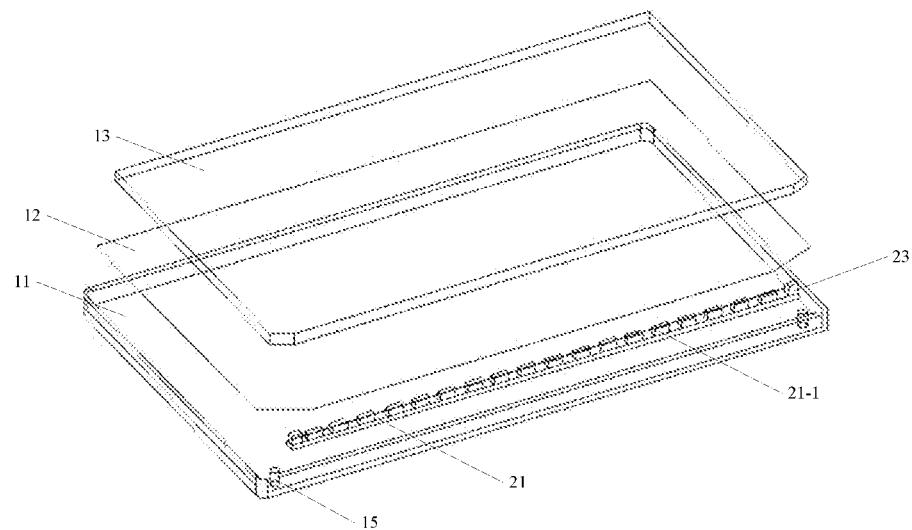
FIG. 1 is an illustrative exploded view of a backlight module according to one embodiment of the disclosure.

The disclosure will be described in further detail below in conjunction with the accompanying drawings and embodiments. It may be understood that the specific embodiments in the following description are merely used to explain the disclosure, and are not intended to limit the disclosure. In addition, it should be noted that, for the sake of a brief description, only those parts relating to the disclosure are shown in the drawings.

Unless otherwise defined, technical terms or scientific terms used in the disclosure should have the meanings commonly understood by those ordinarily skilled in the art. "First", "second" and similar terms used in the disclosure do not indicate any sequence, number or importance, and are merely used to distinguish different constituent parts. The term such as "comprise" or "include" is intended to indicate that an element or item in front of this term contains elements or items listed behind this term as well as equivalents of these elements or items, and shall not exclusive of other elements or items. Terms such as "connection" and "connect" are not limited to physical or mechanical connection, and may include electrical connection no matter it is direct or indirect. Terms such as "upper", "lower", "left" and "right" are merely used to indicate relative positional relations, and once the absolute positions of objects referred to are changed, these relative positional relations may change accordingly.

It should be noted that the embodiments of the disclosure and features in the embodiments may be combined without any contradictions. The disclosure will be described in detail below in conjunction with the accompanying drawings and embodiments.

The inventor finds that existing backlight modules have the following problem: the distance between the light guide plate and a light source on the light strip is 0.1 mm-0.5 mm, so the light guide plate irradiated by the light source may be softened (the softening temperature is about 90° C.) when the ambient temperature is high (such as over 40° C.). If the backlight modules are configured for a long time, the light guide plate may be fused under the heat of the light source of the backlight module, and multiple irretrievable grooves may be formed in the light guide plate, so the life and reliability of the light guide plate are compromised, and the backlight effect is reduced.

To solve the above-mentioned problems, the disclosure provides a backlight module structure allowing the distance between a light guide plate and a light source to be changed. Specifically, the light guide plate is able to move away from the light source under high temperature by means of its thermal expansion and cold contraction property.

Figure 2:
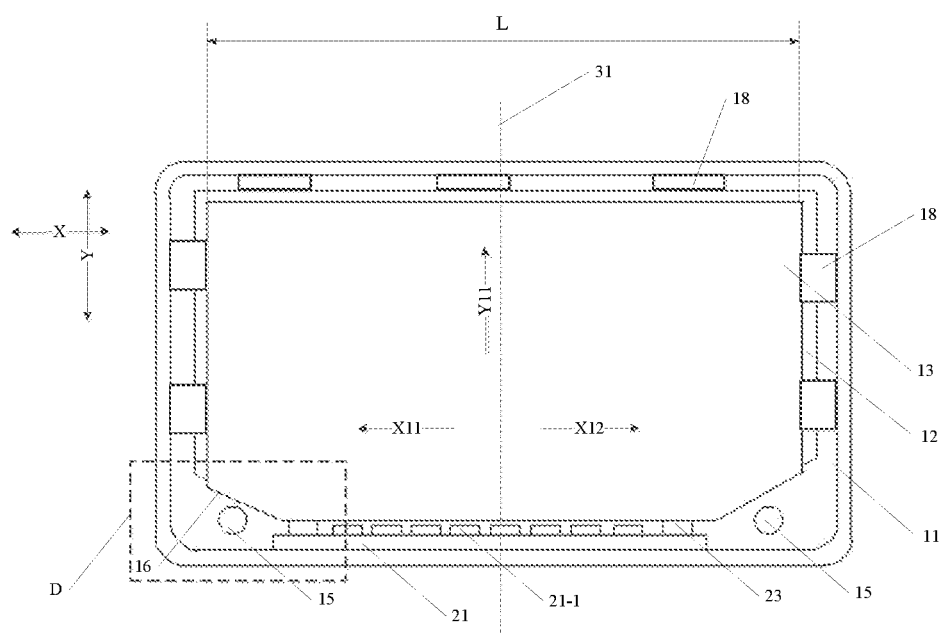
FIG. 2 is an assembled view of the backlight module in FIG. 1.

FIG. 1 is an illustrative exploded view of a backlight module according to one embodiment of the disclosure, and FIG. 2 is an assembled view of the backlight module in FIG. 1. As shown in FIG. 1 and FIG. 2, a backlight module comprises a backplane 11, a reflector plate 12 and a light guide plate 13 that are disposed in sequence;

A light strip 21 disposed on a first side of the light guide plate 13; and

A plurality of positioning assemblies disposed at two ends of the first side of the light guide plate 13 respectively, wherein each positioning assembly comprises a positioning element 15 disposed on the backplane 11 and a guide surface 16 disposed at a corner of the first side of the light guide plate 13, such that the light guide plate 13 will be driven to move away from the light strip 21 under a reactive force of the positioning elements 15 when expanding, and will not be fused or deformed.

As shown in FIG. 2, the positioning assemblies are disposed on the first side, where the light strip 21 is located, of the light guide plate (a lower side of the light guide plate in FIG. 2), such that the light guide plate 13 is able to move away from or close to the light strip 21 under the effect of the positioning assemblies; and multiple light sources 21-1 are disposed on the light strip 21. The first side may be any side of the light guide plate 13, and this disclosure has no limitation in this aspect. For example, when the light guide plate is rectangular, the first side may be any one of the four sides of the rectangular light guide plate.

In some embodiments, as shown in FIG. 2, the guide surfaces 16 are slopes extending towards two sides of a center line 31 of the first side of the light guide plate 13 to be away from the light strip, and the center line 31 is perpendicular to the light strip 21;

Planes where the slopes are located are perpendicular to a first plane of the light guide plate, and the first plane is a plane with the maximum area of all surfaces of the light guide plate.

The directions of the sloped guide surfaces 16 and the features of the planes where the guide surfaces are located will be described below in conjunction with FIG. 2. For the sake of a convenient description, a first direction X and a second direction Y are set, wherein the first direction X is parallel to the light strip and is perpendicular to the second direction Y. When the light guide plate is a hexahedron, the plane with the maximum area of the light guide plate is a front or back surface of the light guide plate. When the front surface is used as the first plane, the guide surfaces 16 extend away from the light strip 21 in a direction X11 and a direction X12 on two sides of the center line 31, and in FIG. 2, the guide surfaces 16 are slopes tilting in a direction Y11. The planes where the slopes are located are perpendicular to the front surface. The sloped guide surfaces are easy to machine, and are disposed at two ends, without light, of the light strip, such that bright and dark light spots will not be formed on the backlight module. The guide surfaces are disposed on edges of the light guide plate, so the light guide plate is still intact and will not fall apart according to a drop test.

Figure 3:
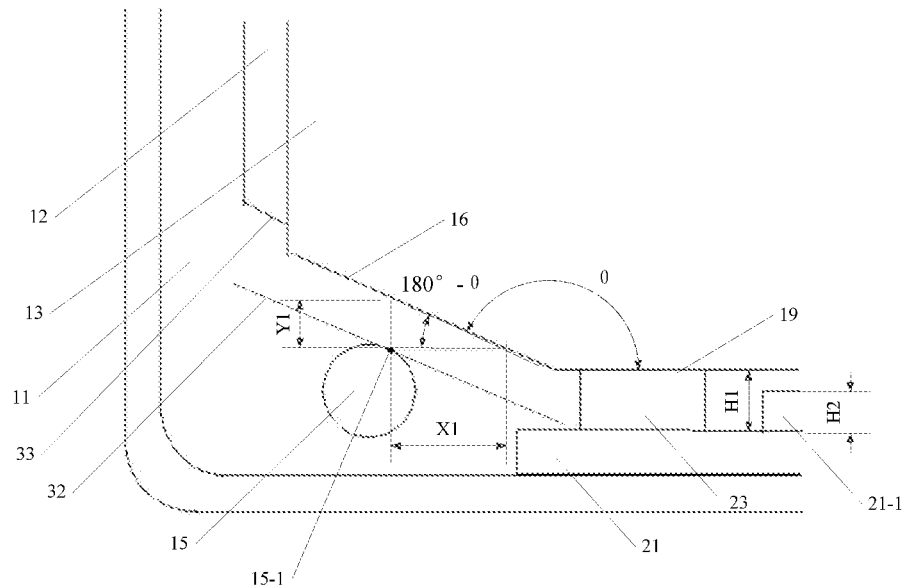
FIG. 3 is an enlarged view of area D in FIG. 2 in a non-expanded state.

As shown in FIG. 2 and FIG. 3, multiple light sources (such as LED lights) 21-1 are disposed on the light strip 21; when expanding towards left and right sides of the first direction X with the increase of the ambient temperature, the light guide plate 15 moves upwards along the guide surfaces 16 under a reactive force of the positioning elements 15, such that the distance between the light strip and the light guide plate is increased, the problem that the light guide plate is fused under the heat of the light sources is solved, and the stability of the light guide plate is improved. In this embodiment, the positioning elements are cylindrical. The cylindrical positioning elements 15 are perpendicularly fixed on the backplane, the central axis of rotation of the cylindrical positioning elements 15 is parallel to the planes where the guide surfaces are located, tangent planes 32 at contact points 15-1 of the positioning elements are parallel to the guide surfaces, and the contact points 15-1 are contact points between the positioning elements and the guide surfaces after the light guide plate expands. The guide surfaces 16 are able to contact with cylindrical surfaces of the cylindrical positioning elements 15, and the light guide plate 13 moves upwards or downwards in the second direction Y under a reactive force of the positioning elements 15. It should be noted that, for each guide surface, one or multiple cylindrical positioning elements 15 may be disposed. When multiple positioning elements are disposed for each guide surface, the tangent planes of the contact points of the positioning elements are located on the same plane.

In case where the guide surfaces 16 are slopes, the positioning elements abut against the guide surfaces when the light guide plate 13 is in a non-expanded state, or a preset distance is set between the positioning elements and the guide surfaces. In this case, edges of the side, corresponding to the light strip, of the reflector plate 12 are also slopes 33, such that the positions of the positioning elements are reserved to ensure that relative movement between the slopes of the light guide plate and the positioning elements will not be affected.

Figure 5:
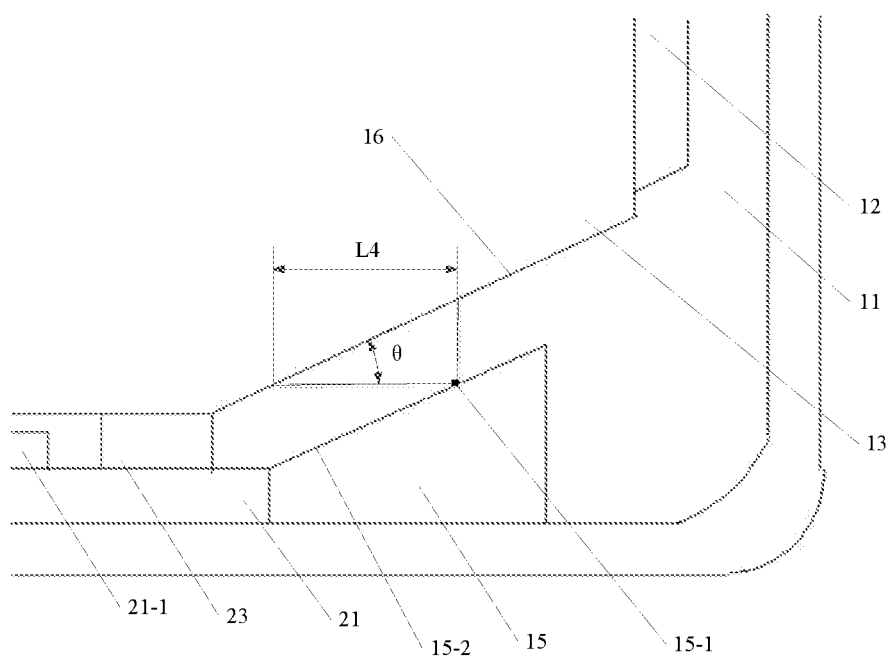
FIG. 5 is an illustrative structural view of a backlight module according to another embodiment of the disclosure.

FIG. 5 is an illustrative structural view of a backlight module according to another embodiment of the disclosure. In some embodiments, the positioning elements are polygonal, and sides 15-2, close to the guide surfaces, of the polygonal positioning elements are parallel to the planes where the guide surfaces 16 are located. In FIG. 5, the positioning elements are right-trapezoidal, wherein the sides 15-2 opposite to the right-angled sides are parallel to the guide surfaces 15. When the expansion value increases with the rise of temperature, the light guide plate will move upwards along the sides 15-2 to be away from the light sources on the light strip 21. When the expansion value decreases with the fall of temperature, the light guide plate 13 will move downwards to return gradually. The positioning elements may also be triangular, pentagonal or the like as long as one side of the positioning elements is parallel to the guide surfaces to allow the guide surfaces of the light guide plate to move in parallel with one side of the polygonal positioning elements, and this disclosure has no limitation in this aspect.

Expansion includes humidity-induced expansion and temperature-induced expansion, and expansion mentioned here mainly refers to the temperature-induced expansion. In a dry environment, the positioning elements 15 abut against the guide surfaces 16 when the light guide plate does not expand; with the rise of temperature, the light guide plate 13 gradually expands towards two sides of the first direction X and moves along the slopes to be away from the light strip in the direction Y11, such that the distance between the light guide plate and the light strip is increased. It should be noted that, as shown in FIG. 2, elastic elements 18 are disposed between the light guide plate and the backplane on left and right sides of the first direction X and above the second direction Y, and the elastic elements 18 are flexible. Support members 23 are disposed on the side where the light strip is located. The support members 23 are made of a rigid material and are unable to deform, such that the light guide plate is prevented from expanding in this direction. It may thus be seen that the light guide plate is allow to expand in the direction X11, the direction X12 and the direction Y11, and will not be deformed when moving upwards.

If the humidity-induced expansion is taken into consideration, a preset distance is set between the positioning elements 15 and the guide surfaces 16 when the light guide plate does not expand, to reserve a space for the humidity-induced expansion. The humidity-induced expansion will not lead to fusion of the light guide plate, but it may result in irreversible deformation of the light guide plate, so in the case of the humidity-induced expansion, the light guide plate 13 does not need to move away from the support members. The preset distance depends on the humidity expansion coefficient. The humidity expansion coefficient is an expansion coefficient of the light guide plate in a saturated moisture state. The temperature expansion coefficient increases with the rise of temperature.

Figure 4:
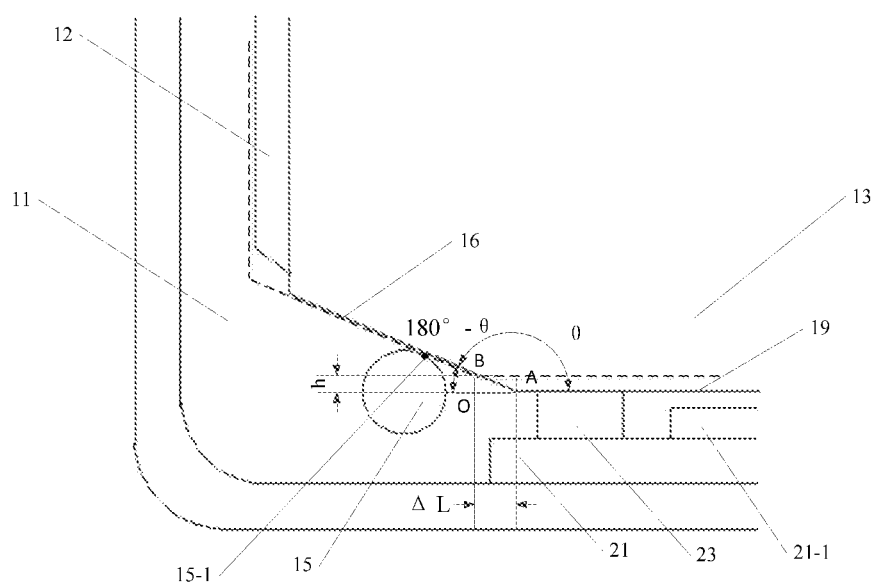
FIG. 4 is an enlarged view of area D in FIG. 2 in an expanded state.

FIG. 4 is an enlarged view of area D in FIG. 1 in an expanded state. With the increase of humidity, the light guide plate expands gradually, and the guide surfaces gradually contact with the positioning elements. After that, the light guide plate moves upwards under the effect of the positioning elements with the further increase of the temperature. To enable the light guide plate to move away from the light strip before reaching the fusing temperature, the angle θ between the guide surfaces 16 and a first edge 19 of the light guide plate should be selected properly.

The angle θ between the guide surfaces 16 and the first edge 19 of the light guide plate is determined according to the following formula:

$$\tan(180°-\theta)=h/(L3-L4) \quad \text{formula 1}$$

Wherein, h is a target moving distance of the light guide plate 13 in the second direction Y of the first plane, L3 is a single-sided expansion value of the light guide plate in the first direction X of the first plane under a target expansion coefficient, and L4 is a single-sided expansion value of the light guide plate in the first direction under a preset critical expansion coefficient. The first direction is parallel to the light strip and is perpendicular to the second direction, and an expansion direction of the first edge is parallel to the first direction. Wherein, the critical expansion coefficient is the humidity expansion coefficient, and the humidity expansion coefficient is an expansion coefficient of the light guide plate in a saturated moisture state. The target expansion coefficient includes the temperature expansion coefficient and the humidity expansion coefficient, and the temperature expansion coefficient increases with the rise of temperature. When a temperature-induced expansion variation is L3-L4, the corresponding moving distance is h, that is, the light guide plate moves in the second direction Y by a distance h to be prevented from being fused.

A detailed description will be given below in conjunction with FIG. 1 and FIG. 4.

The light guide plate may be made of polymethyl methacrylate (PMMA), or transparent plastic (including polystyrene). Generally, the light guide plate is made of 30% of transparent plastic and 70% of polymethyl methacrylate. The thermal/humidity expansion rate of polymethyl methacrylate is large, and the thermal/humidity expansion rate of polystyrene is small. The light guide plate 13 may be made of polystyrene when applied to large-sized TVs. The thermal expansion coefficient of polystyrene is $6*10-5$ M/° C./M.

Polystyrene will expand when heated and affected with damp, and the expansion coefficient of polystyrene in a saturated humidity state is 0.14%. A light guide plate made of a mixture of polystyrene and polymethyl methacrylate and having a length L of 1440 mm will be described below by way of example. The positioning assemblies are disposed on two sides of the light guide plate, the humidity expansion coefficient is 0.14%, and the single-sided humidity expansion value (1440*0.14%)/2=1.008 mm, that is, L4 is 1.008. It may thus be seen that the positioning elements contact with the guide surfaces when the single-sided expansion value of the light guide plate is 1.008 mm. It may be understood that the value of the humidity expansion coefficient varies with the material of the light guide plate. In this embodiment, the humidity expansion coefficient 0.14% is merely an example. In actual disclosure, the humidity expansion coefficient depends on the material of the light guide plate.

With the rise of temperature, the light guide plate further expands. In this embodiment, when the temperature is expected to reach 60°, the moving distance h of the light guide plate is 0.25 mm. When the thermal expansion coefficient is 6*10-5 M/° C./M, the target thermal expansion coefficient under the temperature of 60° is (0.14%+(60°−25°)*6*10−5), wherein the humidity expansion coefficient is 0.14%, a reference temperature before temperature expansion is 25°, and the temperature expansion coefficient under the temperature of 25°-60° is) (60°−25° *6*10-5. In this case, the single-sided target expansion value is L3=1440* (0.14%+) (60°−25° *6*10-5)/2=2.52 mm, and $\Delta L$=L3−L4=1.512. The target position of the light guide plate in an expanded state is marked out by the dotted line in FIG. 4, one end of the guide surface 16 moves from point A to point B, point O is a plumb point of point B on an extension line of the first edge 19, and the right triangle $\Delta OAB$ meets the following relation: $\tan(180°-\theta)=h/\Delta L$, wherein h and $\Delta L$ are known quantities, so the value of $\tan(180°-\theta)$ may be worked out, and then the value of the angle $\theta$ is obtained.

As shown in FIG. 2, when the light guide plate does not expand, a preset distance is set between contact points 15-1 of the positioning elements 15 and the guide surfaces 16, and the contact points 15-1 are contact points between the positioning elements and the guide surfaces after the light guide plate expands;

The preset distance is determined according to a distance X1 in the first direction and a distance Y1 in the second direction, wherein the distance X1 is greater than or equal to the single-sided expansion value L4 under the critical expansion coefficient, and the distance X1 and the distance Y1 meet the following relation:

$$Y1=X1*\tan(180°-\theta)$$

Wherein, $\theta$ is the angle between the slopes and the first edge of the light guide plate;

The distance X1 is a distance from the contact points 15-1 of the positioning elements to the guide surfaces in the first direction X, and the distance Y1 is a distance from the contact points 15-1 of the positioning elements to the guide surfaces in the second direction Y.

A space is reserved between the positioning elements 15 and the guide surfaces, such that the light guide plate may be maintained at the original position during normal use, and the distance between the light guide plate and the light strip may be increased under high temperature to prevent the light guide plate from being fused.

In some embodiments, the distance X1 is equal to the single-sided expansion value L4 under the critical expansion coefficient, and the distance Y1 is determined according to the following formula:

$$Y1=L4*\tan\theta$$

Wherein, $\theta$ is the angle between the slopes and the first edge of the light guide plate;

When the set distance X1 is greater than the single-sided expansion value L4 under the critical expansion coefficient, the specific value of X1 will be set according to the disclosure scenarios, and the disclosure has no limitation in this aspect. As shown in FIG. 5, the distance X1 from the contact points 15-1 of the positioning elements 15 to the guide surfaces in the first direction is the single-sided horizontal humidity expansion value L4 of the light guide plate. That is, when the single-sided expansion value of the light guide plate 13 reaches L4, the planes where the contact points 15-1 are located contact with the guide surfaces 16. It may be understood that when the positioning elements are polygonal, the whole sides 15-2, close to the guide surfaces, of the positioning elements contact with the guide surfaces, so any points may be used as the contact points.

The backlight module further comprises support members 23 disposed on the light strip 21, and the thickness H1 of the support members 23 is greater than the thickness H2 of the light sources on the light strip;

When the light guide plate 13 does not expand, the support members 23 contact with the light guide plate 13.

The support members are in contact with the light guide plate, such that the light guide plate is spaced from the light strip by a certain distance. Specifically, as shown in FIG. 3, the thickness H1 of the support members 23 is greater than the thickness H2 of the light strip 21. When the light guide plate does not expand, the light guide plate contacts with the support members and does not contact with the light strip.

According to the technical solutions provided by the embodiments of the disclosure, the positioning assemblies are disposed on the first side, where the light strip is located, of the light guide plate, such that the light guide plate will be driven to move away from support members under a reactive force of the positioning elements when expanding, and the problem that the light guide plate near the light strip is fused is solved. Furthermore, according to some embodiments of the disclosure, when the light guide plate does not expand, the positioning elements do not contact with the guide surfaces, such that the distance between the light strip and the guide surfaces will not be increased in case of humidity-induced expansion, and a good backlight effect is realized.

In the other aspect, the disclosure provides a displaying device, comprising a display panel and the backlight module provided by the embodiments of the disclosure, wherein the display panel is disposed on a light emitting side of the backlight module.

The above description is merely used to explain preferred embodiments of the disclosure and the technical principles adopted by these embodiments. Those skilled in the art would appreciate that the scope of the disclosure is not limited to technical solutions obtained by specific combinations of the above technical features, and should also include other technical solutions obtained by random combinations of the above technical features or equivalent features thereof without departing from the conception of the disclosure, such as technical solutions obtained by replacing the above technical features with, but not limited to, technical features with similar functions disclosed in the disclosure.

The invention claimed is:

1. A backlight module, comprising a backplane, a reflector plate and a light guide plate, wherein the reflector plate is disposed between the backplane and the light guide plate; the backlight module further comprises:
a light strip disposed on a first side of the light guide plate; and
a plurality of positioning assemblies disposed at two ends of the first side of the light guide plate respectively, wherein each said positioning assembly comprises a positioning element disposed on the backplane and a guide surface disposed at a corner of the first side of the light guide plate;
wherein, the guide surfaces are slopes extending towards two sides of a center line of a first plane of the light guide plate to be away from the light strip, and the center line is perpendicular to the light strip;
planes where the slopes are located are perpendicular to the first plane of the light guide plate, and the first plane is a plane with a maximum area of all surfaces of the light guide plate
an angle $\theta$ between the slopes and a first edge of the light guide plate is determined according to the following formula:

$$\mathrm{Tan}(180°-\theta)=h/(L3-L4)$$

wherein, h is a target moving distance of the light guide plate in a second direction of the first plane, L3 is a single-sided expansion value of the light guide plate in a first direction of the first plane under a target expansion coefficient, L4 is a single-sided expansion value of the light guide plate in the first direction under a critical expansion coefficient, the first direction is parallel to the light strip and is perpendicular to the second direction, and an extension direction of the first edge is parallel to the first direction;
the critical expansion coefficient is a humidity expansion coefficient, and the humidity expansion coefficient is an expansion coefficient of the light guide plate in a saturated moisture state; and
the target expansion coefficient includes a temperature expansion coefficient and the humidity expansion coefficient, and the temperature expansion coefficient increases with the rise of temperature.

2. The backlight module according to claim 1, wherein a preset distance is set between contact points of the positioning elements and the guide surfaces when the light guide plate does not expand, and the contact points are contact points between the positioning elements and the guide surfaces after the light guide plate expands;
the preset distance is determined according to a distance X1 in the first direction and a distance Y1 in the second direction, the distance X1 is greater than or equal to the single-sided expansion value L4 under the critical expansion coefficient, and the distance X1 and the distance Y1 meet the following relation:

$$Y1=X1*\tan(180°-\theta)$$

wherein, $\theta$ is the angle between the slopes and the first edge of the light guide plate; and
the distance X1 is a distance from the contact points of the positioning elements to the guide surfaces in the first direction, and the distance Y1 is a distance from the contact points of the positioning elements to the guide surfaces in the second direction.

3. The backlight module according to claim 2, wherein: the distance X1 is equal to the single-sided expansion value L4 under the critical expansion coefficient, and the distance Y1 is determined according to the following formula:

$$Y1=L4*\tan(180°-\theta)$$

wherein, $\theta$ is the angle between the slopes and the first edge of the light guide plate.

4. The backlight module according to claim 2, wherein the positioning elements are cylindrical, and a central axis of rotation of the cylindrical positioning elements is parallel to the planes where the guide surfaces are located.

5. The backlight module according to claim 4, wherein tangent planes at the contact points of the positioning elements are parallel to the guide surfaces.

6. The backlight module according to claim 2, wherein the positioning elements are polygonal, and sides close to the guide surfaces of the polygonal positioning elements are parallel to the planes where the guide surfaces are located.

7. The backlight module according to claim 1, further comprising support members disposed on the light strip, and a thickness of the support members is greater than a thickness of light sources on the light strips;
when the light guide plate does not expand, the support members contact with the light guide plate.

8. The backlight module according to claim 7, wherein the support members are made of a rigid material.

9. The backlight module according to claim 1, wherein the light guide plate is made of at least one of polystyrene and polymethyl methacrylate.

10. A displaying device, comprising a display panel and the backlight module, wherein the display panel is disposed on a light emitting side of the backlight module, and the backlight module comprising:
a backplane, a reflector plate and a light guide plate; and
a light strip disposed on a first side of the light guide plate;
a plurality of positioning assemblies disposed at two ends of the first side of the light guide plate respectively, wherein each said positioning assembly comprises a positioning element disposed on the backplane and a guide surface disposed at a corner of the first side of the light guide plate;
the guide surfaces are slopes extending towards two sides of a center line of a first plane of the light guide plate to be away from the light strip, and the center line is perpendicular to the light strip;
planes where the slopes are located are perpendicular to the first plane of the light guide plate, and the first plane is a plane with a maximum area of all surfaces of the light guide plate an angle $\theta$ between the slopes and a first edge of the light guide plate is determined according to the following formula:

$$\mathrm{Tan}(180°-\theta)=h/(L3-L4)$$

wherein, h is a target moving distance of the light guide plate in a second direction of the first plane, L3 is a single-sided expansion value of the light guide plate in a first direction of the first plane under a target expansion coefficient, L4 is a single-sided expansion value of the light guide plate in the first direction under a critical expansion coefficient, the first direction is parallel to the light strip and is perpendicular to the second direction, and an extension direction of the first edge is parallel to the first direction;
the critical expansion coefficient is a humidity expansion coefficient, and the humidity expansion coefficient is an expansion coefficient of the light guide plate in a saturated moisture state; and the target expansion coefficient includes a temperature expansion coefficient and the humidity expansion coefficient, and the temperature expansion coefficient increases with the rise of temperature.

11. The displaying device according to claim 10, wherein a preset distance is set between contact points of the positioning elements and the guide surfaces when the light guide plate does not expand, and the contact points are contact points between the positioning elements and the guide surfaces after the light guide plate expands;

the preset distance is determined according to a distance X1 in the first direction and a distance Y1 in the second direction, the distance X1 is greater than or equal to the single-sided expansion value L4 under the critical expansion coefficient, and the distance X1 and the distance Y1 meet the following relation:

$Y1=X1*\tan(180°-\theta)$ wherein, θ is the angle between the slopes and the first edge of the light guide plate; and the distance X1 is a distance from the contact points of the positioning elements to the guide surfaces in the first direction, and the distance Y1 is a distance from the contact points of the positioning elements to the guide surfaces in the second direction.

12. The displaying device according to claim 11, wherein: the distance X1 is equal to the single-sided expansion value L4 under the critical expansion coefficient, and the distance Y1 is determined according to the following formula:

$Y1=L4*\tan(180°-\theta)$ wherein, θ is the angle between the slopes and the first edge of the light guide plate.

13. The displaying device according to claim 10, the positioning elements are cylindrical, and a central axis of rotation of the cylindrical positioning elements is parallel to the planes where the guide surfaces are located.

14. The displaying device according to claim 13, tangent planes at the contact points of the positioning elements are parallel to the guide surfaces.

15. The displaying device according to claim 11, the positioning elements are polygonal, and sides close to the guide surfaces of the polygonal positioning elements are parallel to the planes where the guide surfaces are located.

16. The displaying device according to claim 10, further comprising support members disposed on the light strip, and a thickness of the support members is greater than a thickness of light sources on the light strips;

when the light guide plate does not expand, the support members contact with the light guide plate.

17. The displaying device according to claim 16, wherein the support members are made of a rigid material.

18. The displaying device according to claim 10, wherein the light guide plate is made of at least one of polystyrene and polymethyl methacrylate.

* * * * *